US006771744B1

(12) United States Patent
Smith et al.

(10) Patent No.: US 6,771,744 B1
(45) Date of Patent: Aug. 3, 2004

(54) METHODS AND SYSTEMS FOR DATA COLLECTION AND PROCESSING IN ASSOCIATION WITH SERVICE PERFORMED IN A TELECOMMUNICATIONS SYSTEM

(75) Inventors: Steven G. Smith, Roswell, GA (US); Gary P. Schwaiger, Marietta, GA (US); Jeffery Lynn Hughes, Kennesaw, GA (US); Timothy Andrew Cotter, Mableton, GA (US); Dennis Ray Medlin, Stone Mountain, GA (US); Mitchell E. Davis, Palmetto, GA (US)

(73) Assignee: BellSouth Intellectual Property Corporation, Wilmington, DE (US)

( * ) Notice: Subject to any disclaimer, the term of this patent is extended or adjusted under 35 U.S.C. 154(b) by 48 days.

(21) Appl. No.: 10/103,045

(22) Filed: Mar. 21, 2002

(51) Int. Cl.[7] .................................... H04M 1/64
(52) U.S. Cl. .................................... 379/67.1
(58) Field of Search ...................... 379/1.01, 9.01–9.02, 379/9.03, 9.04, 29.01, 37.01, 93.01, 93.05, 93.06, 29.1, 90.01; 714/1, 2, 3, 25, 27, 28, 48, 57, 100; 709/217

(56) References Cited

U.S. PATENT DOCUMENTS 4,841,560 A 6/1989 Chan et al.
4,922,516 A 5/1990 Butler et al.
4,977,399 A 12/1990 Price et al.
5,666,481 A * 9/1997 Lewis ........................... 714/4
5,687,212 A 11/1997 Kinser, Jr. et al.
5,881,131 A 3/1999 Farris et al.
5,896,440 A 4/1999 Reed et al.
5,897,640 A * 4/1999 Veghte et al. ............... 707/202
5,920,846 A 7/1999 Storch et al.
5,987,381 A 11/1999 Oshizawa
6,192,314 B1 2/2001 Khavakh et al.

(List continued on next page.)

FOREIGN PATENT DOCUMENTS

EP 0 712 227 A2 5/1996
EP 0 712 227 A3 11/1999
WO WO 00/02365 1/2000

OTHER PUBLICATIONS

U.S. patent application No. 10/032,530 filed Oct. 25, 2001.
International Application No. PCT/US02/33667 filed Oct. 25, 2001

(List continued on next page.)

*Primary Examiner*—Roland Foster
(74) *Attorney, Agent, or Firm*—Kirkpatrick & Lockhart LLP

(57) ABSTRACT

Methods and systems are provided for collecting and transmitting data obtained in association with service performed by a technician at a customer service location in a telecommunications system. One method embodiment includes the steps of: accessing an access device operatively connected to a technician server of the telecommunications system; displaying at least one screen on the access device, wherein the screen is adapted to receive data collected in association with the service performed at the customer location; completing the screen with at least a portion of the collected data; and, transmitting the completed screen to the technician server. Computer-readable media embodiments of the present methods are also provided. One system embodiment includes at least one access device operatively associated with a technician server. The access device is configured to display at least one screen adapted to receive data collected in association with the service performed at the customer location. The access device is also configured to complete the screen with the collected data. In addition, the technician server is configured to receive at least one completed screen.

22 Claims, 12 Drawing Sheets

U.S. PATENT DOCUMENTS

| | | | | |
|---|---|---|---|---|
| 6,332,163 | B1 | | 12/2001 | Bowman-Amuah |
| 6,343,290 | B1 | * | 1/2002 | Cossins et al. ............... 707/10 |
| 6,389,426 | B1 | * | 5/2002 | Turnbull et al. ............ 707/102 |
| 6,427,119 | B1 | | 7/2002 | Stefan et al. |
| 6,430,562 | B1 | * | 8/2002 | Kardos et al. ................ 707/10 |
| 6,477,526 | B2 | | 11/2002 | Hayashi et al. |
| 6,484,092 | B2 | | 11/2002 | Seibel |
| 6,505,120 | B2 | | 1/2003 | Yamashita et al. |
| 6,516,055 | B1 | * | 2/2003 | Bedeski et al. .......... 379/32.01 |
| 6,526,349 | B2 | | 2/2003 | Bullock et al. |
| 6,532,418 | B2 | | 3/2003 | Chun et al. |
| 2002/0120713 | A1 | * | 8/2002 | Gupta et al. ................ 709/217 |

OTHER PUBLICATIONS

U.S. patent application No. 10/060,562 filed Jan. 30, 2002.
U.S. patent application No. 10/074,325 filed Feb. 12, 2002.
International Application No. PCT/US03/02742 filed Jan. 30, 2003.
U.S. patent application No. 10/175,699 filed Jun. 20, 2002.
U.S. patent application No. 10/246,188 filed Sep. 18, 2002.
U.S. patent application No. 10/032,853 filed Oct. 25, 2001.
U.S. patent application No. 10/445,861 filed May 27, 2003.
International Application No. PCT/US02/33755 filed Oct. 22, 2002.

* cited by examiner

FIGURE 3

| Field | Data Entry |
|---|---|
| | |
| Technician CUID: | Pre-populated |
| DSL Service Line: | Pre-populated |
| Customer Name: | Pre-populated |
| Customer Address: | Pre-populated |
| DSL Job Type: | Synch at NID |
| | CPE Installation |
| | CPE Self Install Assist |
| | CPE Repair/Maintenance |
| Actual Start Date: | HH:MM:am/pm/MM:DD:YYYY (Completed by Technician) |
| Actual End Time: | HH:MM:am/pm/MM:DD:YYYY (Completed by Technician) |

FIGURE 4A

Did you obtain Synch at the NID?

YES ☐ NO ☐

FIGURE 4B

Was any work performed in order to get Synch?

YES ☐ NO ☐

FIGURE 4C

| Field | Data Entry |
|---|---|
| | |
| Changed Pair | Long Loop |
| | Bridge Tap Found |
| | Load Coils Found |
| | Other/Physical |
| | Other (comment box, 30 characters) |
| Cut Dead Ahead | |
| Central Office | Found CO Wiring Incomplete |
| | Found DSLAM Failure |
| | Other (comment box, 30 characters) |
| Other - Type Over | (comment box, 30 characters) |

Synch at NID Comments: 256 Characters (Optional)

Enter SEND

FIGURE 4D

No Synch was Obtained.
Please Input Failure Reason.

| Field | Data Entry |
| --- | --- |
| | |
| 1. Failure - CO | |
| 2. Failure - Loop | Long Loop Length |
| | Other / Physical (comments - 128 characters) |
| 3. Other - Type Over | (comments - 128 characters) |

Synch at NID Comments: 256 Characters (Optional)

Enter SEND

FIGURE 5

| Field | Data Entry |
| --- | --- |
| | |
| Speed at NID | Text 8 Char, Required |
| Speed at PC | Text 8 Char, Required |
| Technology Type | PPPoE |
| | PPPoA |
| | Bridged Ethernet |
| | Other - Type Over |
| Modem Used | Alcatel 1000 |
| | Efficient 3060 |
| | Efficient 4060 |
| | Other - Type Over |
| NIC used | PCI |
| | ISA |
| | Other Type Over |
| NIC MAC Address | Text 30, (optional) |
| Splitter/Filter | External Splitter |
| | Internal Splitter |
| | Filters |
| | Other (30 characters) |
| Inside Wire Placed Y/N | Required |
| Additional Jack Installed Y/N | Required |
| Equipment Comments: | (Optional - 256 Characters) |

FIGURE 6A

| CPE INSTALLATION | |
|---|---|
| **COLUMN 1** | **COLUMN 2** |
| | |
| Successful | |
| Unsuccessful - COMPANY Network | No Sync-at-NID |
| | VPI/VCI Mapping Problem |
| | Hardware Complete, VPI/VCI Mapping Problem |
| | Needs NID Replacement |
| | COMPANY Network Failed |
| Unsuccessful - NSP | Invalid Order |
| | NSP Registration Problem |
| | Installer No Show |
| | Wrong ADSL Phone Number |
| | Hardware Complete, Registration Server Down |
| | Hardware Complete, DHCP Server Problem |
| | Help Desk Scheduling Problem |
| Unsuccessful - Customer | Customer No Show |
| | PC Qualification, LAN Conflict |
| | PC Qualification, Hardware Disqualified |
| | PC Qualification, Laptop/No PCMCIA Card |
| | PC Qualification, No NIC for Apple/MAC |
| | PC Qualification, No Available Interrupt/Slot |
| | PC Qualification, OS Disqualification |
| | Inside Wiring Problem |
| | Customer Requests Reschedule |
| | Customer Cancels, PC Not Qualified |
| | Customer Cancels, Inside Wiring |
| | Customer Cancels, Too Expensive |
| | Customer Cancels, Delays |
| | Customer Cancels, Competitive Offer |
| | Customer Cancels, 30 Char A/N |
| Other - Type Over | 30 Char A/N |

Enter SEND

FIGURE 6B

| CPE SELF INSTALL ASSIST | |
|---|---|
| **COLUMN 1** | **COLUMN 2** |
| | |
| Successful | Customer Surfing When Arrived |
| | CPE Defective |
| | CPE Incorrect |
| | Inside Wiring Problem - Burglar Alarm |
| | Inside Wiring Problem - Multiline Phone |
| | Inside Wiring Problem - Unable to Use Filters |
| | COMPANY Network Trouble |
| | NSP Registration Problem |
| | VPI/VCI Mapping Problem |
| | Other - COMPANY/NSP Caused |
| | Other - Customer Caused Failure |
| Unsuccessful - COMPANY Network | No Sync-at-NID |
| | VPI/VCI Mapping Problem |
| | COMPANY Network Failed |
| Unsuccessful - NSP | NSP Registration Problem |
| | Installer NO Show |
| | Hardware Complete, Registration Server Down |
| | Help Desk Scheduling Problem |
| Unsuccessful - Customer | Customer No Show |
| | PC Qualification, LAN Conflict |
| | PC Qualification, Hardware Disqualified |
| | PC Qualification, Laptop/No PCMCIA Card |
| | PC Qualification, No MIC for Apple/MAC |
| | PC Qualification, No Available Interrupt/Slot |
| | PC Qualification, OS Disqualification |
| | Inside Wiring Problem |
| | Customer Requests Reschedule |
| | Customer Cancels, PC Not Qualified |
| | Customer Cancels, Inside Wiring |
| | Customer Cancels, Too Expensive |
| | Customer Cancels, Delays |
| | Customer Cancels, Competitive Offer |
| | Customer Cancels, 30 Char A/N |
| Other - Type Over | 30 Char A/N |

Enter SEND

FIGURE 6C

| CPE REPAIR/MAINTENANCE | |
|---|---|
| **COLUMN 1** | **COLUMN 2** |
| | |
| Successful | |
| Unsuccessful - COMPANY Network | No Sync-at-NID |
| | VPI/VCI Mapping Problem |
| | Hardware Complete, VPI/VCI Mapping Problem |
| | Needs NID Replacement |
| | COMPANY Network Failed |
| Unsuccessful - NSP | Invalid Order |
| | NSP Registration Problem |
| | Installer No Show |
| | Wrong ADSL Phone Number |
| | Hardware Complete, Registration Server Down |
| | Hardware Complete, DHCP Server Problem |
| | Help Desk Scheduling Problem |
| Unsuccessful - Customer | Customer No Show |
| | PC Qualification, LAN Conflict |
| | PC Qualification, Hardware Disqualified |
| | PC Qualification, Laptop/No PCMCIA Card |
| | PC Qualification, No NIC for Apple/Mac |
| | PC Qualification, No Available Interrupt/Slot |
| | PC Qualification, OS Disqualification |
| | Inside Wiring Problem |
| | Customer Requests Reschedule |
| | Customer Cancels, PC Not Qualified |
| | Customer Cancels, Inside Wiring |
| | Customer Cancels, Too Expensive |
| | Customer Cancels, Delays |
| | Customer Cancels, Competitive Offer |
| | Customer Cancels, 30 Char A/N |
| Other - Type Over | 30 Char A/N |

Enter SEND

FIGURE 7A

| Interface Element Name | Description |
|---|---|
| ADSL Service Line | The telephone number of the ADSL line on the Service Order or Trouble Ticket. |
| Customer Name | The name of the customer on the Service Order or Trouble Ticket. |
| Customer Address | The address of the customer on the Service Order or Trouble Ticket. |
| Actual Start Time & Date | The time and date the Technician was dispatched on the Service Order or Trouble Ticket. |
| Actual End Time & Date | The time and date the Service Order or Trouble Ticket was completed or cleared. |
| ADSL Job Type | This list of job types allows the technician to select the type of work dispatched. |

FIGURE 7B

| Interface Element Name | Description |
|---|---|
| Speed At NID | This is the maximum data transfer rate achieved at the Network Interface Device. |
| Speed At PC | This is the maximum data transfer rate achieved at the Computer. |
| Modem Used | This is the type of modem used for the Service Order or Trouble Ticket. |
| NIC Used | This is the type of Network Interface Card used, if any. |
| NIC MAC Address | This is the manufacturer's equipment address that is associated with the hardware. |
| Splitter / Filter | This field allows the technician to enter the type of splitter or filter used, if any. |
| Inside Wire Placed? | This field allows the technician to indicate whether any Inside Wire was placed. |
| Additional Jack Installed? | This field allows the technician to indicate whether any Additional jacks were installed. |
| Equipment Comments | This field allows the technician to enter any additional comments about the equipment. |

METHODS AND SYSTEMS FOR DATA COLLECTION AND PROCESSING IN ASSOCIATION WITH SERVICE PERFORMED IN A TELECOMMUNICATIONS SYSTEM

BACKGROUND OF THE INVENTION

Efficient customer service is an essential requirement for commercial enterprises to compete successfully in today's business world. In the telecommunications industry, for example, providing customer service is an important part of sustaining market share in view of the many competitors in the industry. In addition, to promote revenue growth for the commercial enterprise, it is also important to provide customer service in a cost effective manner.

A telecommunications company, for example, needs effective methods and systems for installing and maintaining services offered to its customers. Installation and maintenance service technicians typically need to collect a wide variety of data when performing field service operations for customers of the telecommunications company. In the presence of other competitive local carriers in the telecommunications market, however, the telecommunications company may be required to collect and report the data acquired during service operations to other entities offering telecommunications services. Digital subscriber line (DSL) service is one example of a service offered by a telecommunications company for which data needs to be collected and processed.

In one conventional process, service is performed on telecommunications equipment at a customer location by a service technician of a telecommunications company. Data are collected and transmitted at the time the service is performed for further processing by computer systems employed by a company that offers a service such as DSL, for example. Typically, at least part of this collected data is communicated by the technician to the company through a telephone or other wireline connection. This can result, however, in sacrificing productive time of the technician while the technician remains on hold, for example, waiting for an attendant to communicate with the technician and receive the collected data. In addition, in this conventional process, it can be seen that data are not provided on a near real-time basis for further processing and analysis. Furthermore, this process does not readily support providing installation and maintenance services for a variety of network service providers in a common, open market for a particular service such as DSL service, for example.

What are needed, therefore, are methods and systems for enhanced collection and communication of data acquired during service performed in connection with telecommunications product offerings. Methods and systems are also needed to promote efficient and cost effective collection, processing, analysis and reporting of data in connection with telecommunications technology.

SUMMARY

In one embodiment of the present methods and systems, a method is provided for collecting and transmitting data obtained in association with service performed by a technician at a customer service location in a telecommunications system. The method includes the steps of: accessing an access device operatively connected to a technician server of the telecommunications system; displaying at least one screen on the access device, wherein the screen is adapted to receive data collected in association with the service performed at the customer location; completing the screen with at least a portion of the collected data; and, transmitting the completed screen to the technician server. Computer-readable media embodiments of the present methods are also provided.

In another embodiment of the present methods and systems, a system is provided for collecting and transmitting data obtained in association with service performed by a technician at a customer service location in a telecommunications system. The system includes at least one access device operatively associated with a technician server. The access device is configured to display at least one screen adapted to receive data collected in association with the service performed at the customer location. The access device is also configured to complete the screen with the collected data. In addition, the technician server is configured to receive at least one completed screen.

BRIEF DESCRIPTION OF THE FIGURES

FIG. 3 is a schematic example of a screen display provided in accordance with methods and systems for data collection and processing;

FIGS. 4A through 4D include schematic examples of screen displays provided in accordance with methods and systems for data collection and processing;

FIG. 5 is a schematic example of a screen display provided in accordance with methods and systems for data collection and processing;

FIGS. 6A through 6C include schematic examples of screen displays provided in accordance with methods and systems for data collection and processing; and, FIGS. 7A and 7B include tabulations of terms employed in connection with the screen displays of FIGS. 3 through 6C.

DETAILED DESCRIPTION

Figure 1:
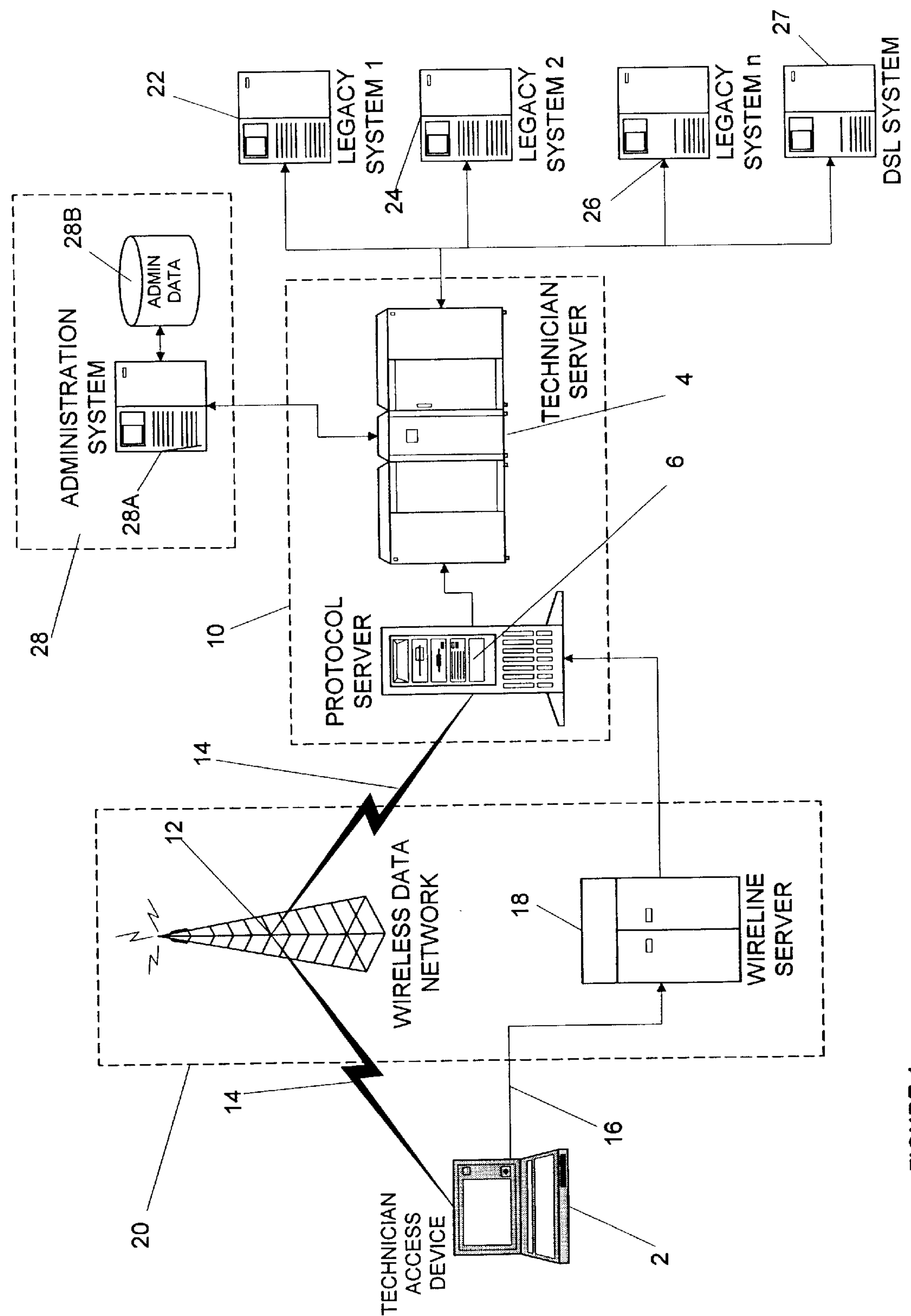
FIG. 1 is a schematic diagram depicting one embodiment of a system for collecting and processing information obtained from service performed in a telecommunications system.
Figure 2:
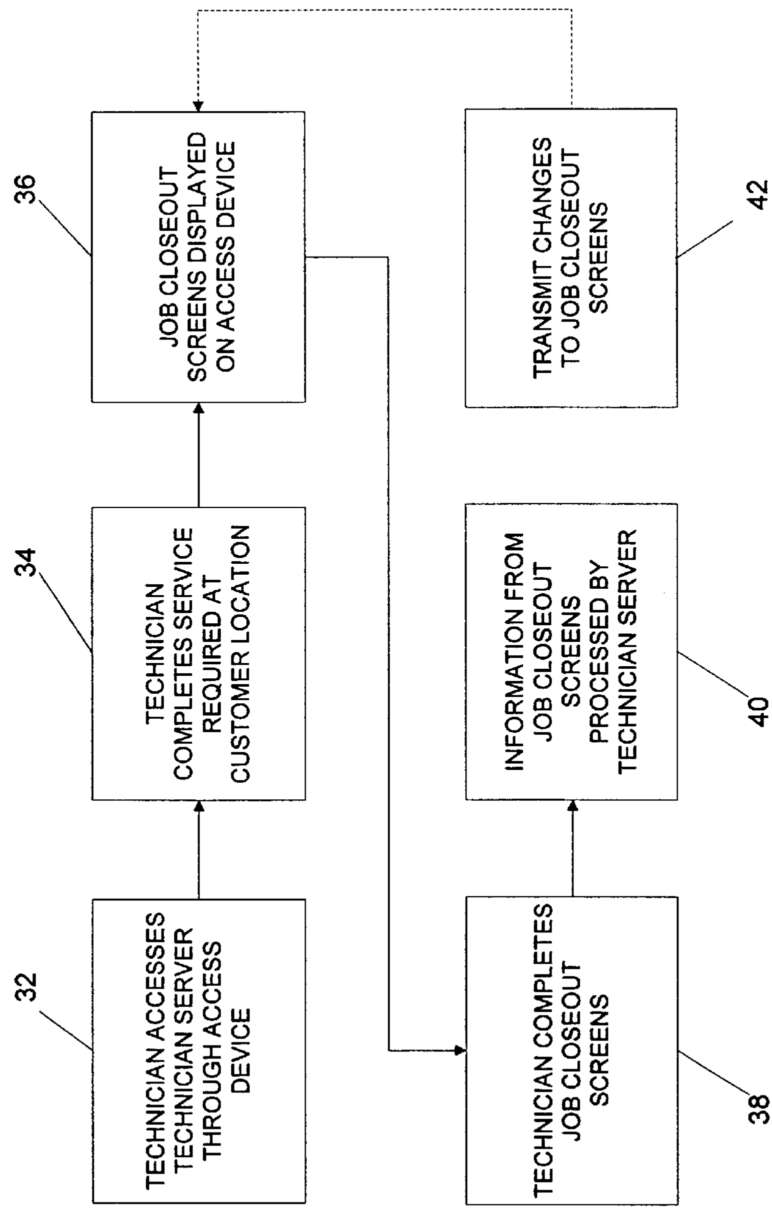
FIG. 2 is a process flow diagram showing one embodiment of a method for collecting and processing information obtained from service performed in a telecommunications system.

Referring now to FIGS. 1 and 2, a service technician working at a customer service location in a telecommunications network is provided with a technician access device 2. The access device 2 assists the technician in gathering, receiving and transmitting information related to service performed on telecommunications equipment.

The access device 2 can be, for example, a wireless personal computer, a laptop, a personal digital assistant (PDA), a wireless pager or any other device suitable for receiving and transmitting data associated with providing service at the customer service location. As used herein, a "computer" may be a microcomputer, minicomputer, laptop, personal data assistant, cellular phone, two-way pager, processor, or any computerized device capable of transmitting and receiving data over a shared network. The access device 2 can also be "ruggedized" as that term is understood in the art to resist physical damage during field service operations, for example.

In addition, the access device 2 can be a remote and portable computer used by the technician. The access device 2 can include memory for storing certain software applications used in obtaining and communicating data. The memory can be internal or external. The memory can also include any means for storing software, including a hard disk, an optical disk, floppy disk, ROM (read only memory), RAM (random access memory), PROM (programmable ROM), EEPROM (extended erasable PROM), and other like computer-readable media.

The access device 2 is also configured and programmed to permit the service technician to access a technician server 4. The technician server 4 functions as a transaction request broker between a protocol server 6 and one or more other systems operatively connected to the technician server 4. Collectively, the technician server 4 and the protocol server 6 can be considered a systems interface 10 for the system embodiment shown in FIG. 1. Access to the technician server 4 can be enabled through a wireless data network 12 through a radio frequency connection 14. Access to the technician server 4 can also be enabled by a modem connection 16 to a wireline server 18. The wireless data network 12 and the wireline server 18 can collectively be considered a communications network 20 for purposes of illustration and convenience of disclosure of the present methods and systems.

The communications network 20 may be any communications network that permits a computer to access a remote server. The communications network 20 can be a wireline network, wireless or cellular network, satellite network, and so forth. In one aspect of the present methods and systems, the communications network 20 is a Public Switched Telephone Network (PSTN) such as, for example, the BellSouth Communications Network (BSCN). The communications network 20 can also be a wireless communications network such as, for example, the Cingular Wireless Network.

As shown in FIG. 1, the protocol server 6 receives and processes communications from the communications network 20. During operation of the access device 2 by a technician or other user, the protocol server 6 processes information transmitted from the access device 2 including, for example, a user ID, a password, a radio serial number, an access device serial number, and other similar data associated with the service technician performing service on telecommunications equipment at a customer location. These and other types of data can be processed by the communications network 20 and the systems interface 10 through a number of legacy systems 22, 24, 26. These other data can include, for example, customer account number, signal decibel level, circuit number, signal response time, as well as many other types of data acquired from the service location.

In general, the protocol server 6 provides a protocol and middleware interface between the access device 2 and the technician server 4. The protocol server 6 may receive user requests or other messages from the access device 2; route requests or messages to the technician server 4; receive responsive information from the technician server 4; and route responsive information back to the access device 2. In one embodiment of the present methods and systems, the protocol server 6 can include one or more NT servers running "NetTech" software from Broadbeam Corporation (Princeton, N.J.). In another embodiment, the technician server 4 can utilize UNIX operating system software executed on an Informix database management system. In another aspect, the protocol server 6 can include one or more WINDOWS NT servers (Microsoft Corporation) configured to assign one or more logical ports to transmissions received from the access device 2.

In one or more embodiments of the present methods and systems, the communications network 20, the systems interface 10, the access device 2, the software and hardware contained on the access device 2 and other aspects of the present disclosure are provided in accordance with the disclosure of the commonly owned, U.S. patent application Ser. No. 09/343,815, entitled "Systems and Methods for Utilizing a Communications Network for Providing Mobile Users Access to Legacy Systems" ("the '815 application"), the entirety of which is hereby incorporated by reference. In one embodiment in accordance with the '815 application, the technician server 4 is provided in connection with the trade-designated "TECHNET" system. In another aspect of the present methods and systems, the technician server 4 can be a server having a "TECHACCESS" trade designation (Telcordia Technologies). In general, the technician server 4 can be a conventional server configured and programmed to verify and/or process information, including test data, received from the access device 2.

In general, the technician server 4 provides an interface to the legacy systems 22, 24, 26 from which responsive information can be retrieved. The technician server 4 may service requests, generate legacy transactions in connection with one or more of the legacy systems 22, 24, 26 in response to those requests, and receive responsive information to be forwarded back to the protocol server 6. The legacy systems 22, 24, 26 are generally mainframe-type computer systems that maintain data for a company. According to one or more embodiments of the present methods and systems, the legacy systems 22, 24, 26 can include one or more of the following systems: a loop facility assignment control system; a loop maintenance operations system; a computer system for mainframe operations; a mechanized loop testing system; a secure network element contract server; a mechanized time reporting system; a work activity statistical sampling plan system; and other similar systems.

In one aspect of the present methods and systems, a DSL system 27 is employed for collecting and processing data related to DSL service provided by a telecommunications company. An example of a legacy system configured in accordance with the DSL system 27 is the "AELERA" system of BellSouth Telecommunications (Atlanta, Ga.), which can be used for collecting and processing data related to service performed in connection with DSL technology.

In addition, an administration system 28 can be operatively associated with the technician server 4. The administration system 28 can include a server 28A and one or more databases 28B that contain information related to performing service at a customer location. The database 28B contains a variety of information related to the technician, the equipment employed by the technician such as the access device 2, for example, and data related to numerous customer service locations. Examples of data maintained in the administration system 28 can include, without limitation, serial numbers of technician access devices; technician names; names of technician supervisors; maintenance center indicia; indicia associated with the version of software employed by access devices; user name and password information; telecommunications equipment information, and the like. In general, the administration system 28 includes hardware and software that interact with the technician server 4 to provide information to one or more technicians at one or more customer service locations.

Referring now to FIG. 1, a user of the access device 2, such as a technician, can access the systems interface 10 through the communications network 20. The technician may log in through the protocol server 6 to the technician server 4 using a user name and other data, such as a password and/or primary host group address. Once the technician has been authenticated as a legitimate user of the access device 2, a "TECHNET" session can be established and the access device 2 can be connected through the communications network 20 to the systems interface 10. The systems interface 10 permits the access device 2 to make requests for information from the legacy systems 22, 24, 26. The user can make the requests by entering commands into the access device 2 that are input to the systems interface 10. After receiving input commands, the systems interface 10 processes the inputs to generate user requests and generate legacy transactions based on the user requests, receive information from the legacy systems 22, 24, 26, and transmit the information back to the access device 2. In addition, the administration system 28 can interact with the access device 2 during login such as, for example, to verify user name and password information or to transmit information to the access device 2.

The access device 2 can include software that executes a client application for accessing the systems interface 10. In one aspect, the access device 2 executes the client application disclosed as the "TECHNET" client application in the '815 application. The "TECHNET" client application includes a graphical user interface (GUI) layer that provides a user interface for receiving requests for information from the user, displaying information retrieved from the legacy systems 22, 24, 26, displaying information transmitted by the administration system 28, and other user interface tasks. A technician can make the requests by keyboard entry of inputs, for example, to the client GUI included with the access device 2. The technician can select a particular operation such as, for example, "Retrieve Customer Information" by using the client application on the access device 2. In operation, the access device 2 can also interact with the administration system 28 to obtain data related to service performed at a customer location.

Referring now to FIGS. 1 and 2, in one embodiment of the present methods and systems, a technician accesses the technician server 4 in step 32 at a customer location using the access device 2. The technician proceeds to perform service required at the customer location in step 34. In one aspect, this service can include installation and/or maintenance of the DSL service at the customer location. In step 36, a series of "job closeout" screens are presented to the technician to facilitate collection of data related to the service performed at the customer location. This series of screens can be presented to the technician within the client application stored on the access device 2.

In step 38, the technician completes entry of data into the required fields in the screens. In one aspect, the technician cannot proceed with other activities associated with the access device 2 until the job closeout screens are completed in step 38. In another aspect, the service performed at the customer location cannot be completed until confirmation is received that the information entered into the screens by the technician has been successfully transmitted to the technician server 4 for further processing in step 40. Visual and/or auditory notification, for example, can be provided on the access device 2 of a successful data transmission to the technician server 4. In step 40, the transmitted data can be further processed by the technician server 4 such as in the DSL system 27, for example.

It can be appreciated that telecommunications technology is dynamic and data that may be required to be collected and reported by the technician is subject to periodic and possibly frequent changes. For example, different modem types may be developed by various manufacturers and released to the market on a frequent basis. If new data is required on the installation, operation and/or maintenance of these modems, existing data collection methods and systems typically need to be modified so that the new data can be collected and processed. Such data collection modifications, however, might require tables to be created in the administration system 28, for example, to collect specific fields of required data. To make the necessary modifications might require the implementation of certain development steps: defining the requirements of the modifications to be made; scheduling the development work to be done; developing any required hardware and/or software; testing and validating the operation of any required hardware and/or software; and, distributing the modified software and/or hardware to the appropriate technician or technicians.

In contrast, in one embodiment of the present method shown in step 42 of FIG. 2, each time a technician first accesses job closeout screens on the access device 2 in a given time period (e.g., daily), a comparison is performed between table creation dates in the client application and their corresponding creation dates in the administration system 28. If data within the administration system 28 have been changed, the changes can be transmitted to the client application on the access device 2 along with job closeout screens that reflect the updated data. Therefore, the download to the client application can include only the data that has been added, changed or deleted based on a timestamp comparison, for example. This is accomplished by a method and system that enables the screens to be changed by inputting field descriptors into the administration system 28 in connection with data stored in the administration system 28.

It can be seen that the job closeout screens of the present methods and systems enable a technician to report data that can be viewed by other providers of telecommunications services such as line sharing service providers, for example. This can be facilitated by providing access to the DSL system 27, for example, to a variety of data service entities.

In one illustrative, example embodiment involving DSL service provided by the technician, a series of job closeout screens can be presented once the technician has completed service operations at a customer location. The screen displays of FIGS. 3 through 6C can be presented to the technician on the access device 2 based on service performed at the customer location. For convenience of illustration, the tables of FIGS. 7A and 7B provide a more detailed description of various fields presented in the screen displays of FIGS. 3 through 6C.

In addition, for convenience of illustration, more than one choice for data entry in a screen display can indicate a drop-down menu or its equivalent functionality that permits the technician to make a choice among different options for a given field. In addition, the data entry section can be pre-populated through the interaction of the access device 2 with the technician server 4 and other components such as the administration system 28, for example. The data entry section can also require a manual data entry by the technician based on data collected during service performed at the customer service location. As can be seen, some data entry sections include a predetermined character maximum for convenience of data collection and transmission. Furthermore, some data entry sections may be required to complete a given screen, whereas other data entry sections may be edited at the discretion of the technician.

Figures 4A, 4B:
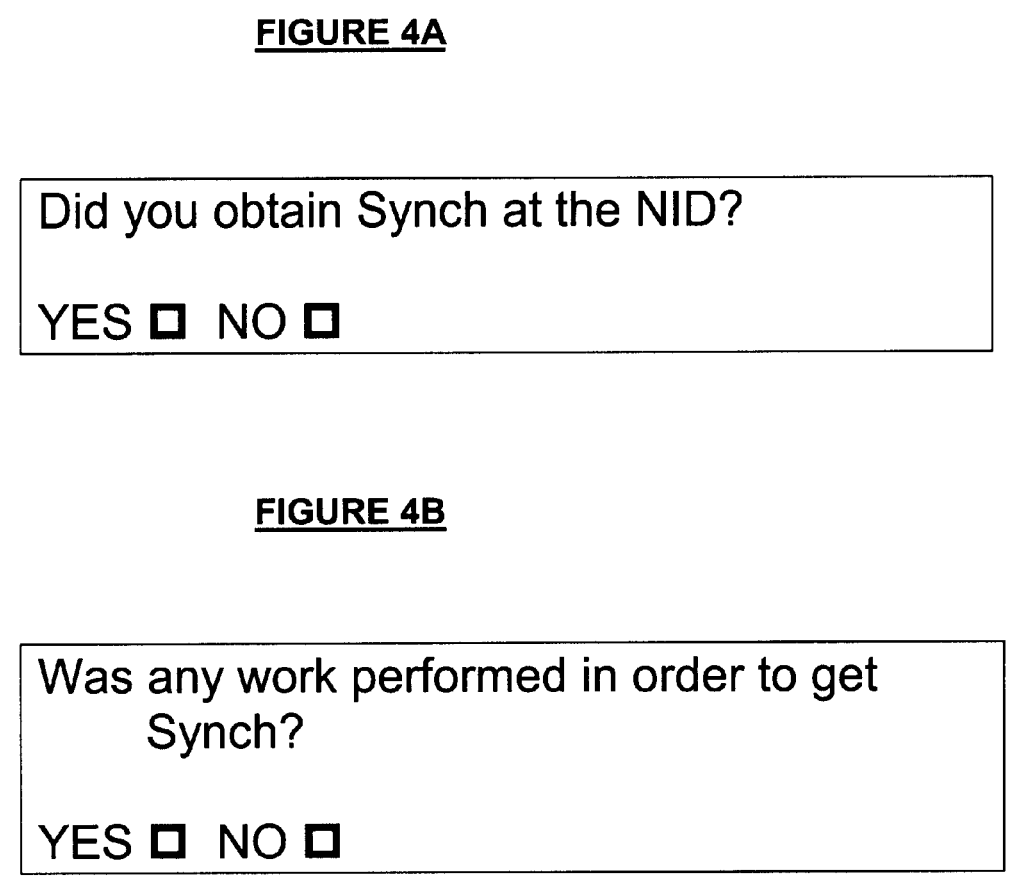

Referring now to FIG. 3, a first screen display is presented to the technician on a screen of the access device 2. The screen display of FIG. 3 requires the technician to choose a "DSL Job Type" as shown. If the "DSL Job Type" selected is "Synch at NID" (synchronization at Network Interface Device), then the screen display of FIG. 4A is presented to the technician on the access device 2. If the "DSL Job Type" selected is a choice that includes a "CPE" type service, then the screen display of FIG. 5 is presented to the technician on the access device 2.

Referring now to FIG. 4A, if the query presented is answered in the affirmative, then the screen display of FIG. 4B is presented to the technician. If the query presented by FIG. 4A is answered in the negative, then the screen display of FIG. 4D is presented to the user.

Referring now to FIG. 4B, if the answer to the query presented is in the negative, then the screen information collected from the technician can be considered complete for the service performed at the customer location. Additional queries may be presented thereafter in further screens that query the user on the readiness of the entered data prior to its transmission by the access device 2 through the technician server 4 to the DSL system 27, for example. In another aspect, a functionality may be provided that permits the technician to review data entries in the screens prior to submitting the entered data for further processing.

If the answer to the query presented by FIG. 4B is in the affirmative, then the screen display of FIG. 4C is presented to the technician. Once the appropriate choices are made on the screen of FIG. 4C, the closeout information can be considered complete and the access device 2 can complete processing of the closeout data as discussed above in accordance with FIG. 4B. This can be accomplished by clicking a "Enter SEND" button associated with the screen display as shown in FIG. 4C. In addition, comments can be entered by the technician in the "Synch at NID Comments" data entry section as shown.

As discussed above, if the query presented by FIG. 4A is answered in the negative, then the screen display of FIG. 4D is presented to the technician. As shown, appropriate choices can be made by the technician in the situation where no synchronization was obtained at the customer location. Once the screen of FIG. 4D is completed, the closeout information can be considered complete and the access device 2 can finalize processing of the closeout data as discussed above in accordance with FIG. 4B. This can be accomplished by clicking an "Enter SEND" button associated with the screen display as shown in FIG. 4D. In addition, comments can be entered by the technician in the "Synch at NID Comments" data entry section as shown.

Referring now to FIG. 5, if a "CPE" type service is performed by the technician, then the appropriate choices associated with that service can be made as shown. In addition, based on the particular "CPE" service being performed, an additional screen display can be presented to the technician for data entry. According to which job type is selected, technician input can be required for the screen display shown in FIG. 6A for a CPE Installation job type; for the screen display shown in FIG. 6B for a CPE Self Install Assist job type; and, for the screen display of FIG. 6C for a CPE Repair/Maintenance job type. As shown in FIGS. 6A through 6C, a selection from both Columns 1 and 2 can be made by the technician during data entry. After selections have been made and input is complete, an "Enter SEND" button can be pressed to finalize data entry as discussed above with regard to FIG. 4B. The technician can then be returned to a main menu screen in the "TECHNET" client application of the access device 2.

The term "computer-readable medium" is defined herein as understood by those skilled in the art. A computer-readable medium can include, for example, memory devices such as diskettes, compact discs of both read-only and writeable varieties, optical disk drives, and hard disk drives. A computer-readable medium can also include memory storage that can be physical, virtual, permanent, temporary, semi-permanent and/or semi-temporary. A computer-readable medium can further include one or more data signals transmitted on one or more carrier waves.

It can be appreciated that, in some embodiments of the present methods and systems disclosed herein, a single component can be replaced by multiple components, and multiple components replaced by a single component, to perform a given function. Except where such substitution would not be operative to practice the present methods and systems, such substitution is within the scope of the present invention.

Examples presented herein are intended to illustrate potential implementations of the present communication method and system embodiments. It can be appreciated that such examples are intended primarily for purposes of illustration. No particular aspect or aspects of the example method and system embodiments described herein are intended to limit the scope of the present invention.

Whereas particular embodiments of the invention have been described herein for the purpose of illustrating the invention and not for the purpose of limiting the same, it can be appreciated by those of ordinary skill in the art that numerous variations of the details, materials and arrangement of parts may be made within the principle and scope of the invention without departing from the invention as described in the appended claims.

What is claimed is:

1. A method for collecting and transmitting data obtained in association with service performed by a technician at a customer service location in a telecommunications system, said method comprising the steps of:

accessing an access device operatively connected to a technician server of said telecommunications system;

displaying at least one screen on said access device, said screen adapted to receive data collected in association with said service performed at said customer service location, wherein said service performed at said customer service location includes digital subscriber line service;

completing said screen with at least a portion of said collected data;

transmitting said completed screen to said technician server; and comparing at least one creation date for data in said access device with at least one corresponding creation date for said data in an administration system of said telecommunications system.

2. The method of claim 1, further comprising not permitting access to said access device until said completing step is performed.

3. The method of claim 1, further comprising not permitting access to said access device until a confirmation is received that said transmitting step has been performed successfully.

4. The method of claim 1, further comprising processing said collected data in said transmitted screen in at least one legacy system of said telecommunications system.

5. The method of claim 1, further comprising transmitting at least one updated screen in connection with said comparing step.

6. The method of claim 1, further comprising permitting access to said collected data in said completed screen by at least one service provider.

7. A system for collecting and transmitting data obtained in association with service performed by a technician at a customer service location in a telecommunications system, said system comprising:

at least one access device operatively associated with a technician server, said access device configured to display at least one screen adapted to receive data collected in association with said service performed at said customer service location, said access device configured to complete said screen with said collected data, wherein said service performed at said customer service location includes digital subscriber line service, said technician server configured to receive at least one said completed screen, and said technician server configured to compare at least one creation date for data in said access device with at least one corresponding creation date for said data in an administration system of said telecommunications system.

8. The system of claim 7, further comprising at least one legacy system operatively associated with said technician server, said legacy system being adapted for receiving said collected data from said completed screen.

9. The system of claim 7, further comprising an administration system operatively associated with said technician server, said administration system including at least one data field corresponding to at least one data field of said screen.

10. The system of claim 9, wherein said data field includes a stamp indicative of a creation date of said data field.

11. A computer-readable medium containing instructions for assisting a computer system to perform a method for collecting and transmitting data obtained in association with service performed by a technician at a customer service location in a telecommunications system, said method comprising the steps of:

accessing an access device operatively connected to a technician server of said telecommunications system;

displaying at least one screen on said access device, said screen adapted to receive data collected in association with said service performed at said customer service location, wherein said service performed at said customer service location includes digital subscriber line service;

completing said screen with at least a portion of said collected data;

transmitting said completed screen to said technician server; and comparing at least one creation date for data in said access device with at least one corresponding creation date for said data in an administration system of said telecommunications system.

12. The medium of claim 11, further comprising not permitting access to said access device until said completing step is performed.

13. The medium of claim 11, further comprising not permitting access to said access device until a confirmation is received that said transmitting step has been performed successfully.

14. The medium of claim 11, further comprising processing said collected data in said transmitted screen in at least one legacy system of said telecommunications system.

15. The medium of claim 11, further comprising transmitting at least one updated screen in connection with said comparing step.

16. The medium of claim 11, further comprising permitting access to said data collected in said completed screen by at least one service provider.

17. A system for collecting and transmitting data obtained in association with service performed by a technician at a customer service location in a telecommunications system, said system comprising:

access means operatively connected to a server means of said telecommunications system;

means for displaying at least one data collection means on said access means, said data collection means adapted to receive data collected in association with said service performed at said customer service location, wherein said service performed at said customer service location includes digital subscriber line service;

means for completing said data collection means with at least a portion of said collected data;

means for transmitting said completed data collection means to said server; and means for comparing at least one creation date for data in said access means with at least one corresponding creation date for said data in an administration means of said telecommunications system.

18. The system of claim 17, further comprising means for not permitting access to said access means until said data collection means is completed.

19. The system of claim 17, further comprising means for not permitting access to said access means until a confirmation is received that said means for transmitting has successfully transmitted said completed data collection means.

20. The system of claim 17, further comprising means for processing said collected data in said completed data collection means.

21. The system of claim 17, further comprising means for transmitting at least one updated data collection means in connection with the determination of said means for comparing.

22. The system of claim 17, further comprising means for permitting access to said collected data in said completed data collection means by at least one service provider.

* * * * *